United States Patent Office 3,324,171
Patented June 6, 1967

3,324,171
A-NORSTEROIDS
Seymour David Levine, Princeton, and Patrick Andrew Diassi, Westfield, N.J., assignors, by mesne assignments, to E. R. Squibb & Sons, Inc., New York, N.Y., a corporation of Delaware
No Drawing. Filed Apr. 13, 1964, Ser. No. 359,417
11 Claims. (Cl. 260—488)

This invention relates to the synthesis of steroids and has for its object the provision of a new class of physiologically active steroids, which may be represented by the formula

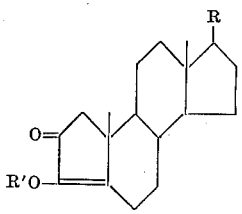

wherein R is β-acetyl, β-R′O or keto, and R′ is hydrogen, the acyl radical of a hydrocarbon carboxylic acid of less than twelve carbon atoms, or an alkyl of less than twelve carbon atoms.

Those compounds of the above formula, wherein R is β-R′O or keto, are physiologically active substances which possess both androgenic and anabolic activities. Hence, these compounds can be used in lieu of known androgenic or anabolic steroids, such as testosterone, in the treatment of conditions which respond to such treatment, being formulated for such administration in the same type of parenteral preparations as testosterone, for example, with concentration and/or dosage based on the activity of the particular compound.

Those compounds of the above formula, wherein R is β-acetyl, are physiologically active substances which possess antiandrogenic activity. Hence, these compounds can be used in lieu of known antiandrogenic steroids, such as A-norprogesterone, in the treatment of hyperandrogenic acne, being formualted for such administration in topical preparations with concentration and/or dosage based on the activity of the particular compound.

The new compounds of this invention are prepared by either of two alternative methods. In the first method, A-nortestosterone or A-norprogesterone is converted to its 2-ketal or 2,20-diketal derivative, respectively, by reacting with a 1,2- or 1,3-dihydric alcohol, such as ethylene glycol and propylene glycol, in the presence of an acid catalyst, such as p-toluenesulfonic acid and perchloric acid. The reaction is preferably conducted in the presence of an organic solvent, such as benzene, for the steroid reactant, at an elevated temperature, such as the reflux temperature of the solvent.

This first step of the process of this invention yields new intermediates of this invention of the formula

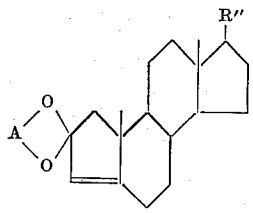

wherein R″ is the ketal of β-acetyl with the dihydric alcohol or β-hydroxy, and A is lower alkylene, preferably ethylene or 1,2-propylene.

The ketals are then reacted with osmium tetroxide in the presence of a base, such as an organic base (e.g., pyridine). The reaction is preferably carried out in the presence of an organic solvent for the steroid reactant, such as benzene, at any normal temperature, such as ambient temperature.

This second step of the process yields new intermediates of this invention of the formula

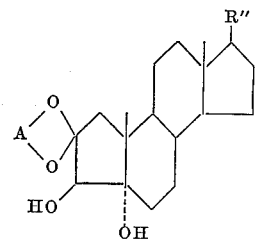

wherein R″ and A are as hereinbefore defined.

The 3α,5α-dihydroxy intermediates are then hydrolyzed in the usual manner, as by treatment with a dilute aqueous acid, such as p-toluenesulfonic acid and sulfuric acid, preferably in the presence of an organic solvent for the steroid reactant at an elevated temperature, such as the reflux temperature of the solvent.

This third step of the process yields new intermediates of this invention of the formula

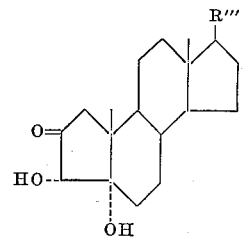

wherein R‴ is β-acetal or β-hydroxy.

The resulting 3α,5α-dihydroxy compound is then dehydrated by treatment with a dilute base, such as an alkali metal hydroxide (e.g. potassium hydroxide) to yield the corresponding Δ³-3-hydroxy final products of this invention, wherein R is β-acetyl or β-hydroxy and R′ is hydrogen.

Alternatively, A-nortestosterone and A-norprogesterone can be converted directly to their respective 3-hydroxy derivatives by treatment with osmium tetroxide in the presence of an organic base, such as pyridine and then treating the reaction mixture with a dilute aqueous base, such as an alkali metal hydroxide (e.g., potassium hydroxide).

If a 17-keto product is desired, the 17β-hydroxy compound (i.e., Δ³-A-norandrostene-2-one-3,17β-diol) is oxidized, as by treating with chromium trioxide, to convert the 17-hydroxy group to a 17-keto derivative.

If an ester derivative is desired, the final products, wherein a hydroxy group is present in the 3-position, is acylated in the usual manner by treatment with an acyl halide or acid anhydride of the desired acid. Particularly preferred are the acyl chlorides and acid anhydrides of hydrocarbon carboxylic acids having less than twelve carbon atoms, as exemplified by the lower alkanoic acids (e.g. acetic, propionic and enanthic acid), the monocyclic aromatic carboxylic acids (e.g., benzoic and toluic acid), the monocyclic aralkanoic acids (e.g., phenacetic and β-phenylpropionic acid), the lower alkenoic acids, the cycloalkane carboxylic acids, and the cycloalkene carboxylic acids. The acylation is preferably conducted in the presence of an organic base, such as pyridine. If a compound containing an acetyl or keto group in the 17-position is employed as the steroid reactant a 3-monoester is obtained. If, however, a compound containing a β-hydroxy group in the 17-position is used, a 3,17β-diester is formed.

If an ether derivative is desired, the final products, wherein a hydroxy group is present in the 3-position, is alkylated by refluxing with the desired alkanol in the presence of boron trifluoride. If the resulting 3-alkoxy compound also contains a 17β-hydroxy group, the 17β-ester may then be prepared by treating with an acyl halide or acid anhydride of the desired acid, as described hereinbefore.

The following examples are illustrative of the invention (all temperatures being in centigrade):

EXAMPLE 1

Δ³-A-norandrostene-17β-ol-2-one 2-ethylene ketal

A mixture of 4 g. of A-nortestosterone and 65 mg. of p-toluenesulfonic acid is stirred and refluxed in 250 ml. of benzene and 40 ml. of ethylene glycol for seven days and the water removed by a calcium carbide trap. The benzene layer is separated, and the ethylene glycol layer is diluted with water and extracted with additional benzene. The combined benzene extracts are washed with 8% salt solution, dried over sodium sulfate and evaporated to dryness. The residue is crystallized from isopropyl ether and gives about 2.45 g. of Δ³-A-norandrostene-17β-ol-2-one 2-ethylene ketal, M.P. about 149.5–150.5°; $[\alpha]_D^{22}$ +29° (ethanol);

$\lambda_{max.}^{KBr}$ 2.88, 6.03, 8.83, 9.07, 9.26, and 9.53μ

$\tau^{Si(CH_3)_4}$ 9.22 (s, 18-Me), 8.96 (s, 19-Me), 6.32 (m, 17-H), 6.05 (s, ketal methylenes) and 4.73 (d, J=1 c.p.s., 3-H).

*Analysis.*—Calc'd for $C_{20}H_{30}O_3$ (318.44): C, 75.43; H, 9.50. Found: C, 75.52; H, 9.47.

EXAMPLE 2

Δ³-A-norpregnene-2,20-dione 2,20-bis-ethylene ketal

Following the procedure in Exampe 1 but substituting A-norprogesterone for A-nortestosterone there is obtained Δ³-A-norpregnene-2,20-dione 2,20-bis-ethylene ketal.

Similarly, if propylene glycol is substituted for the ethylene glycol in the procedures of Examples 1 and 2, the corresponding 2-propylene ketal and 2,20-bis-propylene ketal derivatives are obtained, respectively.

EXAMPLE 3

A-norandrostane-2-one-3α,5α,17β-triol 2-ethylene ketal

A mixture of 50 mg. of Δ³-A-norandrostene-17β-ol-2-one 2-ethylene ketal and 47 mg. of osmium tetroxide in 0.4 ml. of pyridine and 10 ml. of benzene is stirred at room temperature for 89 hours. The reaction mixture is evaporated to dryness and the residue dissolved in 8 ml. of chloroform and stirred with 16 ml. of a 1% potassium hydroxide solution containing 1.6 g. of mannitol for 3 hours. The chloroform layer is separated and dried over sodium sulfate. Evaporation gives about 54 mg. of A-norandrostane-2-one-3α,5α,17β-triol 2-ethylene ketal having a melting point of 204–207°. The analytical sample is prepared by recrystallization from benzene, M.P. about 208–209° $[\alpha]_D^{22}$ +46° (ethanol);

$\lambda_{max.}^{KBr}$ 2.90, 3.00μ

$\tau^{Si(CH_3)_4}$ 9.25 (s, 18-Me), 9.01 (s, 19-Me), 6.37 (m, 17-H) and 6.04 (s, ketal methylenes).

*Analysis.*—Calc'd for $C_{20}H_{32}O_5$ (352.46): C, 68.15; H, 9.15. Found: C, 68.19; H, 9.13.

EXAMPLE 4

A-norpregnane-2,20-dione-3α,5α-diol 2,20-bis-ethylene ketal

Following the procedure in Example 3 but substituting Δ³-A-norpregnene-2,20-dione 2,20-bis-ethylene ketal for Δ³-A-norandrostene-17β-ol-2-one-2-ethylene ketal there is obtained A-norpregnane-2,20 - dione-3α,5α-diol 2,20-bis-ethylene ketal.

EXAMPLE 5

A-norandrostane-2-one-3α,5α,17β-triol

A mixture of 225 mg. of A-norandrostane-2-one-3α,5α,17β-triol 2-ethylene ketal, 17 mg. of p-toluenesulfonic acid, 2 ml. of water and 8 ml. of acetone is refluxed for 5 hours. The reaction mixture is evaporated to dryness and diluted with water. The aqueous phase is extracted three times with ethyl acetate, and the ethyl acetate extracts are washed with a saturated sodium bicarbonate solution and 8% salt solution, dried over sodium sulfate and evaporated to dryness. Crystallization of the residue from ethyl acetate gives about 56 mg. of A-norandrostane-2-one-3α,5α,17β-triol having a melting point of about 202–204°. Recrystallization from ethyl acetate gives the analytical sample having M.P. about 206–207°; $[\alpha]_D^{22}$ −40° (EtOH);

$\lambda_{max.}^{KBr}$ 2.86, 2.93, and 5.75μ

$\tau^{Si(CH_3)_4}$ 9.20 (s, 18-Me), 8.85 (s, 19-Me), 6.35 (m, 17-H), and 5.55 (s, 3-H).

*Analysis.*—Calc'd for $C_{18}H_{28}O_4$ (308.42): C, 70.10; H, 9.15. Found: C, 70.20; H, 9.11.

EXAMPLE 6

A-norpregnane-2,20-dione-3α,5α-diol

Following the procedure of Example 5 but substituting A-norpregnane-2,20-dione-3α,5α-diol, 2,20-bis - ethylene ketal for A-norandrostane-2-one-3α,5α,17β-triol 2-ethylene ketal there is obtained A-norpregnane-2,20-dione-3α,5α-diol.

EXAMPLE 7

Δ³-A-norandrostene-2-one-3,17β-diol (1) A mixture of 1.18 g. of A-nortestosterone and 1 g. of osmium tetroxide in 1 ml. of pyridine and 20 ml. of benzene is stirred at room temperature for 65½ hours. The reaction mixture is evaporated to dryness and the residue is dissolved in 100 ml. of chloroform and stirred with 200 ml. of a 1% potassium hydroxide solution containing 20 g. of mannitol for 2½ hours. The layers are separated and the aqueous phase is acidified with hydrochloric acid and extracted five times with chloroform. The chloroform extracts are dried over sodium sulfate and evaporated to dryness. Crystallization of the residue from acetone-hexane gives about 292 mg. of Δ³-A-norandrostene-2-one-3,17β-diol having a melting point of 254.5–255.5°. Recrystallization from acetone-hexane gives the analytical sample having M.P. about 259–260°; $[\alpha]_D^{22}$ =+43° (EtOH);

$\lambda_{max.}^{KBr}$ 2.93, 3.18, 5.87, and 6.02μ; $\lambda_{max.}^{EtOH}$ 265 mμ (ε=12,700)

$\tau^{Si(CH_3)_4}$ 9.19 (s, 18-Me), 8.83 (s, 19-Me), 6.33 (m, 17-H), 4.63 (s, 3-OH).

*Analysis.*—Calc'd for $C_{18}H_{26}O_3$ (290.39): C, 74.44; H, 9.03. Found: C, 74.31; H, 9.01.

(2) A solution of 24 mg. of A-norandrostane-2-one-3α,5α,17β-triol in 5 ml. of chloroform is stirred with 10 ml. of a 1% potassium hydroxide solution containing 1 g. of mannitol for 3 hours. The workup procedure described in Example 7, part 1, is employed and gives Δ³-A-norandrostene-2-one-3,17β-diol.

EXAMPLE 8

Δ³-A-norpregnene-2,20-dione-3-ol

Following the procedures of Example 7, but substituting A-norprogesterone for A-nortestosterone in part 1 or A-norpregnane-2,20-dione-3α,5α-diol for A - norandrostane-2-one-3α,5α,17β-triol in part 2, there is obtained Δ³-A norpregnene-2,20-dione-3-ol.

EXAMPLE 9

Δ³-A-norandrostene-2,17-dione-3-ol

A solution of 150 mg. of Δ³-A-norandrostene-2-one-3,17β-diol in 10 ml. of acetone is treated dropwise with stirring with a slight excess of chromium trioxide-sulfuric acid. The reaction mixture is stirred for three minutes and then two drops of ethanol are added. The acetone is decanted and the inorganic residue washed with additional acetone. The acetone fractions are combined and diluted with water. Filtration gives Δ³-A-norandrostene-2,17-dione-3-ol.

EXAMPLE 10

Δ³-A-norandrostene-2-one-3,17β-diol diacetate

A mixture of 275 mg. of Δ³-A-norandrostene-2-one-3,17β-diol, 0.4 ml. of pyridine and 2 ml. of acetic anhydride is allowed to stand at room temperature for 65 hours. The reaction mixture is poured onto ice and extracted three times with ether. The ether extracts are washed with a saturated sodium bicarbonate solution and 8% salt solution, dried over sodium sulfate, and evaporated to dryness. Crystallization of the residue from isopropyl ether gives about 139 mg. of Δ³-A-norandrostene-2-one-3,17β-diol diacetate having a melting point of 182–184°. Recrystallization from isopropyl ether gives the analytical samples having M.P. about 188.5–189.5°; $[\alpha]_D$ −3° (EtOH);

$\lambda_{max.}^{KBr}$ 5.66, 5.83 and 6.01μ;

$\lambda_{max.}^{EtOH}$ 240 mμ ($\epsilon$=15,000); $\tau^{Si(CH_3)_4}$ 8.98 (s, 18-Me)₀, 8.78 (s, 19-Me),

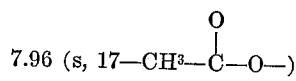

7.96 (s, 17—CH³—C—O—)

7.75 (s, 3-CH₃—C—O—), 5.40 (m, 17-H).

Analysis.—Calcd. for $C_{22}H_{30}O_5$ (374.46): C, 70.56; H, 8.08. Found: C, 70.38; H, 7.91.

EXAMPLE 11

Δ³-A-norpregnene-2,20-dione-3-ol 3-acetate

Following the procedure of Example 10 but substituting Δ³-A-norpregnene-2,20-dione-3-ol for Δ³-A-norandrosten-2-one-3,17β-diol there is obtained Δ³-A-norpregnene-2,20-dione-3-ol acetate.

EXAMPLE 12

Δ³-A-norandrostene-2,17-dione-3-ol acetate

Following the procedure of Example 10 but substituting Δ³-A-norandrostene-2,17-dione-3-ol for the Δ³-A-norandrosten-2-one-3,17β-diol there is obtained Δ³-A-norandrostene-2,17-dione-3-ol acetate.

Similarly, by substituting other acylating agents for the acetic anhydride in the procedures of Examples 10, 11 and 12, the corresponding acyloxy derivatives are formed. Thus, propionic anhydride and benzoyl chloride yield the corresponding propionate and benzoate esters, respectively.

EXAMPLE 13

Δ³-A-norandrostene-2-one-3,17β-diol 3-methyl ether

A mixture of 96 mg. of Δ³-A-norandrostene-2-one-3,17β-diol, 0.1 ml. of boronfluoride ethyl ether, and 20 ml. of methanol is refluxed for 18 hours. The reaction mixture is concentrated, diluted with water, and extracted three times with ethyl acetate. The ethyl acetate extracts are washed with an 8% salt solution, dried over sodium sulfate and evaporated to dryness. Crystallization of the residue from ether gives about 41 mg. of Δ³-A-norandrostene-2-one-3,17β-diol 3-methyl ether having a melting point of about 129.5–130.5°. Recrystallization from isopropyl ether gives the analytical sample having M.P. about 129–130°; $[\alpha]_D^{29}$ +55° (EtOH);

$\lambda_{max.}^{KBr}$ 2.87, 5.87, and 6.05μ;

$\lambda_{max.}^{EtOH}$ 254 mμ ($\epsilon$=11,300), 306 mμ ($\epsilon$=336).

Analysis.—Calcd. for $C_{19}H_{28}O_3$ (304.41): C, 74.96; H, 9.27. Found: C, 75.04; H, 9.28.

EXAMPLE 14

Δ³-A-norandrostene-2,17-dione-3-ol 3-methyl ether

Following the procedure of Example 13 but substituting Δ³-A-norandrostene-2,17-dione-3-ol for the Δ³-A-norandrostene-2-one-3,17β-diol there is obtained Δ³-A-norandrostene-2,17-dione-3-ol 3-methyl ether.

EXAMPLE 15

Δ³-A-norpregnene-2,20-dione-3-ol 3-methyl ether

Following the procedure of Example 13 but substituting Δ³-A-norpregnene-2,20-dione-3-ol for the Δ³-A-norandrostene-2-one-3,17β-diol there is obtained Δ³-A-norpregnene-2,20-dione-3-ol 3-methyl ether.

EXAMPLE 16

Δ³-A-norandrostene-2-one-3,17β-diol 3-methyl ether 17-acetate

Following the procedure of Example 10 but substituting Δ³-A-norandrostene-2-one-3,17β-diol 3-methyl ether for the Δ³-A-norandrostene-2-one-3,17β-diol there is obtained Δ³ - A - norandrostene-2-one-3,17β-diol 3-methyl ether 17-acetate.

The invention may be variously otherwise embodied within the scope of the appended claims.

What is claimed is:

1. A compound of the formula

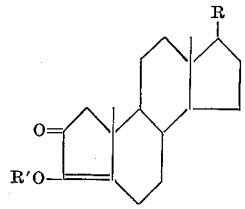

wherein R is selected from the group consisting of β-acetyl, β-R'O and keto, and R' is selected from the group consisting of hydrogen, the acyl radical of a hydrocarbon carboxylic acid of less than twelve carbon atoms, and an alkyl group of less than 12 carbon atoms.

2. Δ³-A-norandrostene-2-one-3,17β-diol.
3. Δ³-A-norpregnene-2,20-dione-3-ol.
4. Δ³-A-norandrostene-2,17-dione-3-ol.
5. Δ³-A-norandrostene-2-one-3,17β-diol diacetate.
6. Δ³-A-norpregnene-2,20-dione-3-ol acetate.
7. Δ³-A-norandrostene-2,17-dione-3-ol acetate.
8. Δ³-A-norandrostene-2-one-3,17β-diol 3-methyl ether.
9. Δ³-A-norandrostene-1,17-dione-3-ol 3-methyl ether.
10. Δ³-A-norpregnene-2,20-dione-3-ol 3-methyl ether.
11. Δ³-A-norandrostene - 2 - one - 3,17β-diol 3-methyl ether-17-acetate.

References Cited

UNITED STATES PATENTS 2,842,571  7/1958  Gamerino et al. ___ 260—397.45
2,919,286  12/1959  Levy et al. _____ 260—397.4

OTHER REFERENCES

Kramer et al., Chemische Berichte, 96, 10, October 1963, p. 2806.

LORRAINE A. WEINBERGER, Primary Examiner.

VIVIAN GARNER, Assistant Examiner.

UNITED STATES PATENT OFFICE
CERTIFICATE OF CORRECTION

Patent No. 3,324,171                          June 6, 1967

Seymour David Levine et al.

It is hereby certified that error appears in the above numbered patent requiring correction and that the said Letters Patent should read as corrected below.

Column 6, line 59, for "1,17-dione" read -- 2,17-dione --.

Signed and sealed this 28th day of November 1967.

(SEAL)
Attest:

Edward M. Fletcher, Jr.
Attesting Officer

EDWARD J. BRENNER
Commissioner of Patents